United States Patent [19]

Schittenhelm et al.

[11] Patent Number: 5,075,263

[45] Date of Patent: Dec. 24, 1991

[54] ENAMEL FRITS FOR ACID-RESISTANT ONE-COAT ENAMELLING ON UNPICKLED STEELS

[75] Inventors: Hans-Joachim Schittenhelm, Leverkusen; Werner Joseph, Cologne, both of Fed. Rep. of Germany

[73] Assignee: Bayer Aktiengesellschaft, Leverkusen, Fed. Rep. of Germany

[21] Appl. No.: 631,210

[22] Filed: Dec. 21, 1990

Related U.S. Application Data

[63] Continuation of Ser. No. 401,279, Aug. 31, 1989, abandoned.

[30] Foreign Application Priority Data

Sep. 13, 1988 [DE] Fed. Rep. of Germany ....... 3831153

[51] Int. Cl.$^5$ .............................................. C03L 6/06
[52] U.S. Cl. ......................................... 501/25; 501/26; 501/58; 501/59; 501/76; 501/77
[58] Field of Search ........................ 501/25, 26, 58, 59, 501/76, 77

[56] References Cited

U.S. PATENT DOCUMENTS

| | | |
|---|---|---|
| 2,930,713 | 3/1960 | Hoffman et al. |
| 3,383,225 | 5/1968 | Stradley et al. |
| 3,556,821 | 1/1971 | Hanzlik et al. ........................ 501/25 |
| 3,668,152 | 6/1972 | Lee ................................... 501/25 X |
| 4,120,729 | 10/1978 | Smyth et al. ...................... 501/25 X |
| 4,193,808 | 3/1980 | Khodsky et al. .................... 501/25 |

FOREIGN PATENT DOCUMENTS 2015072 10/1971 Fed. Rep. of Germany .
3710608 8/1988 Fed. Rep. of Germany .

OTHER PUBLICATIONS

Chemical Abstracts, vol. 83, No. 14, Oct. 6, 1975, p. 381.

*Primary Examiner*—Karl Group
*Attorney, Agent, or Firm*—Sprung Horn Kramer & Woods

[57] ABSTRACT

An enamel frit for producing an acid-resistant enamelled steel in a single coating comprising at least about 40% of silicon atoms, 50% of silicon atoms and boron atoms, where the proportion of the boron atoms should not fall below 6.5%, 63% of silicon atoms, boron atoms and sodium atoms, where the proportion of the sodium atoms should not fall below 7.5%, each relative to the overall total of the non-oxygen atoms in the frit, the proportion of the remaining non-oxygen atoms being less than about 37%, and 1.0 to 1.2% of cobalt atoms. In addition, there are (1) x fluorine atoms with $1\% \leq x \leq 11\%$ and at least y lithium atoms and at most 2y lithium atoms with $y = (15/x) + 5$ being present, the proportion of lithium atoms being from about 6.3% to 20% relative to the overall total of the non-oxygen atoms in the frit, or (2) y lithium atoms with $6.3\% < y \leq 20\%$ and at least x fluorine atoms and at most 2x fluorine atoms with $x = 15/(y-5)$ being present, the proportion of fluorine atoms being from about 1% to 11% relative to the overall total of the non-oxygen atoms in the frit.

2 Claims, No Drawings

ENAMEL FRITS FOR ACID-RESISTANT ONE-COAT ENAMELLING ON UNPICKLED STEELS

This application is a continuation, of application Ser. No. 401,279, filed Aug. 31, 1989 now abandon.

The present invention relates to enamel frits, by means of which acid-resistant enamellings with very good adhesion can be obtained in one coat on steel substrates which have been neither pickled nor nickel-plated.

From European Patent Application 0,284,934, base enamel frits of high boron content are known. The quantities of silicon and titanium are approximately equal to the quantities of boron and aluminum. As an adhesion oxide, nickel oxide in quantities of >3% by weight is fused in, if appropriate together with cobalt oxide (~1% by weight). These base enamel frits show excellent adhesion on unpickled steels, but are hardly acid-resistant (acid class C to D according to DIN 51 150). In order to obtain acid-resistant enamellings, a top enamel frit of acid class AA according to DIN 51 150 must be additionally applied in the second coat.

The use of well adhering and at the same time acid-resistant enamellings in one coat, such as are described in Steklo i. Keram. (1981) 6, page 28 (R. J. Nikitina et al.), in turn presupposes that the steel, on which enamelling is carried out, is pickled and/or nickel-plated beforehand.

Both enamelling on unpickled steels with one base enamel frit and a top enamel frit, and enamelling on pickled, nickel-plated steels with only one frit have economic and ecological disadvantages. The heated pickling and rinsing baths consume a great deal of energy. Furthermore, the spent pickling liquors, the nickel bath and the polluted rinsing liquors must be reprocessed and disposed of. Two-coat enamelling requires additional frit material and further working steps, as compared with one-coat enamelling.

It is therefore the object of the present invention to provide enamel frits which are both acid-resistant (acid class AA) and have very good adhesion to unpickled, not nickel-plated steels, that is to say which are comparable in their properties with the top enamel frits for two-coat enamelling, but have the advantage of good adhesion to unpickled steels, so that the usual base enamelling can be omitted.

It has now been found, surprisingly, that the enamel frits according to the invention show the above-mentioned advantages.

These enamel frits have the following composition:

| | |
|---|---|
| $SiO_2$ | 25 to 65% by weight |
| $B_2O_3$ | 5 to 30% by weight |
| $Na_2O$ | 5 to 25% by weight |
| $Li_2O$ | 2,5 to 10% by weight |
| F | 0,3 to 4% by weight |
| CoO | 1,5 to 2,5% by weight |
| $K_2O$ | 0 to 12% by weight |
| MgO | 0 to 2% by weight |
| CaO | 0 to 16% by weight |
| BaO | 0 to 26% by weight |
| $Al_2O_3$ | 0 to 10% by weight |
| $TiO_2$ | 0 to 14% by weight |
| $ZrO_2$ | 0 to 16% by weight |
| NiO | 0 to 3% by weight |
| CuO | 0 to 3% by weight |
| MnO | 0 to 3% by weight |
| $Fe_2O_3$ | 0 to 3% by weight |
| $MoO_3$ | 0 to 1% by weight |
| ZnO | 0 to 3% by weight | where $\geq 40\%$ of silicon atoms, $\geq 50\%$ of silicon atoms and boron atoms, where the proportion of the boron atoms should not fall below 6.5%, $\geq 63\%$ of silicon atoms, boron atoms and sodium atoms, where the proportion of the sodium atoms should not fall below 7.5%, are present, each relative to the overall total of the non-oxygen atoms in the frit, so that the proportion of the remaining non-oxygen atom is $\leq 37\%$, of which 1.0 to 1.2% are cobalt atoms as well as x fluorine atoms with $1\% \leq x \leq 11\%$ and at least y lithium atoms and at most 2y lithium atoms where $y=(15/x)+5$, the proportion of lithium atoms being greater than 6.3% and less than or equal to 20%, each relative to the overall total of the non-oxygen atoms in the frit.

Further frits according to the invention with the above-mentioned composition contain $\geq 40\%$ of silicon atoms, $\geq 50\%$ of silicon atoms and boron atoms, where the proportion of the boron atoms should not fall below 6.5%, $\geq 63\%$ of silicon atoms, boron atoms and sodium atoms, where the proportion of the sodium atoms should not fall below 7.5%, each relative to the overall total of the non-oxygen atoms in the frit, so that the proportion of the remaining non-oxygen atoms is $\geq 37\%$, and 1.0 to 1.2% of cobalt atoms as well as y lithium atoms with $6.3\% < y \leq 20\%$ and at least x fluorine atoms and at most 2 x fluorine atoms where $x=15/(y-5)$, the proportion of fluorine atoms being greater than or equal to 1% and less than or equal to 11%, each relative to the overall total of the non-oxygen atoms in the frit.

For producing firmly adhering, acid-resistant one-coat enamellings on unpickled steels, the enamel frits according to the invention are used and are ground in the presence of a hydrogen polysiloxane, applied electrostatically as frit powder to unpickled steel substrates and fired at temperatures between 790° and 860° C.

A second process for producing acid-resistant one-coat enamellings with good adhesion to unpickled steels comprises using the enamel frits according to the invention and griding them in the presence of water, clay, floating salts and quartz, applying them by the conventional wet process to the unpickled steel substrates and firing at temperatures above 830° C.

The enamel frits according to the invention can be used for regenerative heat exchangers and for vessels which come into contact with acids.

The proportion of the fluorine and lithium atoms and their atomic ratio among themselves are particularly important for the enamel frits according to the invention. If a proportion of fluorine falling within the claimed ranges is chosen, the proportion of lithium can no longer be chosen independently. Although enamel frits with, for example, proportions of fluorine greater than 11% or proportions of lithium greater than 20% likewise give very good adhesion, they lead to defective enamellings (pores, pinholes in the enamel coat). Furthermore, the acid resistance is lost.

If, however, the fluorine content, for example, is within the range according to the invention and if the lithium content is chosen so that it no longer satisfies the equation, enamellings with bad adhesion are obtained even if all other conditions of the claimed composition are met.

If the Co content is increased beyond the value according to the invention of 1.2%, the adhesion profile deteriorates.

The atom numbers can readily be calculated analogously to the establishment of a chemical formula according to analysis, by dividing the oxidic batch in % by weight by the corresponding molecular weights and setting them into a mutual ratio which is as near as possible to the whole numbers. The percentage data relate to atoms, with the exception of the oxygen atoms in the enamel frit.

The invention will be explained in more detail by reference to specific illustrative examples and comparative examples.

For a commercially available acid-resistant enamel frit for steels, the resulting atom numbers of the non-oxygen atoms are, for example, 4601 silicon atoms, 384 titanium atoms, 1146 boron atoms, 79 aluminum atoms, 425 calcium atoms, 112 barium atoms, 1418 Na atoms, 1162 lithium atoms, 269 K atoms, 155 F atoms, 45 Co atoms, 72 Ni atoms, 61 Cu atoms and 71 Mn atoms. These atom numbers are calculated analogously to a chemical formula, by dividing the percentages by weight of the oxidic constituents and of the fluorine in the enamel frit by the corresponding molecular weights and expressing the numerical ratio in such a way that the total of these atom numbers gives 10,000.

Using the above-mentioned atom numbers of the commercially available frit, the result is that the total of the non-oxygen atoms is made up of 46% of Si atoms, of 57% of Si atoms and B atoms, of 72% of Si atoms, B atoms and Na atoms, of 0.45% of Co atoms, of 11.62% of Li atoms and of 1.55% of F atoms. The frit is thus outside the claimed range. This frit gives inadequate adhesion on unpickled steels.

To assess the adhesion properties, the commercially available enamel frit was, as described in German Patent Specification 2,015,072, applied as a powder in an electric field to 1 mm thick steel sheet strips of 45 cm length and 6 cm width. The strips had been degreased but not pickled. The coating was fused on in a temperature gradient furnace in the course of 10 minutes in the temperature range from 750° to 900° C. The coating thickness of the enamel frit thus burned in is between 0.14 and 0.18 mm. The adhesion test was carried out at the points where the firing temperature had been 790° C., 810° C., 830° C. and 860° C. Corresponding to DEZ data sheet F 6.2, the adhesion test was carried out using an impact instrument with deformation of the steel sheet, and rated (1=very good, 2=good, 3=acceptable, 4=inadequate, 5=no adhesion). For the above-mentioned commercially available enamel frit, no adhesion was found at 790° C., and the adhesion found was inadequate at 810° C., acceptable at 830° C. and inadequate at 860° C.

By contrast, enamellings with the enamel frits according to the invention show very good adhesion on unpickled steel and, in addition, they are acid-resistant. The enamel frits mentioned in Examples 1 to 4 give enamellings, with which the adhesion is very good at all four firing temperatures (790° C., 810° C., 830° C., 860° C.).

| Elements | Atom numbers | | | |
|---|---|---|---|---|
| | Example 1 | Example 2 | Example 3 | Example 4 |
| Si | 4365 | 4308 | 4620 | 4172 |
| Ti | 370 | 367 | 294 | 300 |

-continued

| | Example 1 | Example 2 | Example 3 | Example 4 |
|---|---|---|---|---|
| B | 1103 | 1094 | 1270 | 1167 |
| Al | 76 | 75 | 19 | — |
| Ca | 409 | 406 | 153 | 142 |
| Ba | 108 | 107 | 104 | — |
| Na | 1365 | 1353 | 1592 | 1593 |
| Li | 1485 | 1162 | 810 | 1260 |
| K | 259 | 257 | 165 | 144 |
| F | 155 | 568 | 520 | 961 |
| Co | 109 | 108 | 103 | 109 |
| Ni | 69 | 69 | 77 | 74 |
| Cu | 59 | 58 | 66 | — |
| Mn | 68 | 68 | 75 | 67 |
| Fe | — | — | 132 | 11 |
| ΣElements | 10000 | 10000 | 10000 | 10000 |
| | Example 1 | Example 2 | Example 3 | Example 4 |
| ΣSi | 44% | 43% | 46% | 42% |
| ΣSi + B | 55% | 54% | 59% | 54% |
| ΣSi + B + Na | 69% | 68% | 75% | 70% |
| ΣCo | 1.09% | 1.08% | 1.03% | 1.09% |
| ΣF | 1.55% | 5.68% | 5.20% | 9.61% |
| ΣLi | 14.85% | 11.62% | 8.10% | 12.60% |

The enamel frits according to the invention of Examples 1, 2, 3 and 4 were smelted from commercially available enamel raw materials such as quartz powder, borax, alkali metal carbonates and alkaline earth metal carbonates, felspar, titanium dioxide, alkali metal fluorosilicates and the appropriate heavy metal oxides at 1220° C. to give a completely reacted fusion, and quenched over water-cooled steel rollers.

The flakes thus obtained were applied, electrostatically as a powder and by spraying as a slip, to unpickled steel substrates of 45 cm length, 6 cm width and 0.1 cm thickness and fired for 10 minutes in a gradient furnace in the temperature range from 750° to 900° C.

For the powder application, 100 g of enamel flakes and 0.4 g of methyl-hydrogen-siloxane were ground in a porcelain ball mill until the powder residue on the 16900 mesh screen (mesh width 40 μm) was less than 20% by weight. The powder, having a surface resistivity of more than $10^{13}$ Ω, was applied in a quantity of 14 g (corresponding to 5.2 g/dm$^2$) in a uniform coating to the steel substrates by means of an electrostatic gun with a voltage of 70 kV applied. After firing, the adhesion test with the drop tester gave very good adhesion over the entire temperature range for all the examples.

For the slip application, 1 kg of enamel flakes was ground to give a slip in a ball mill filled with 3.5 kg of heavy grinding balls, according to the following mill batch:

| | % by weight |
|---|---|
| Enamel frit | 100 |
| Clay | 4.5 |
| Boric acid | 0.2 |
| Sodium nitrite | 0.2 |
| Potassium silicate hydrate | 0.1 to 0.3 |
| Sodium aluminate | 0.1 |
| Water | 50 |
| Grinding fineness | 0.5 to 1.0% residue on 3600 mesh screen |
| Density | 1.73 g/ml |

Such a quantity of this slip was applied by spraying to the unpickled steel substrates that an enamel coating thickness of 0.15 mm resulted after firing. After drying, the coated steel substrates were fired above 830° C. The adhesion test by the drop tester gave very good adhesion for all the examples.

The enamellings of Examples 1 to 4 were tested for their acid resistance. The instructions in DIN 51 150 contain the precise procedure. The classification in accordance with decreasing resistance is made visually. It is carried out after the action of a 10% strength citric acid solution in water at room temperature for 15 minutes. Examples 1 to 4 gave the best possible acid class (AA).

Examples 1 to 4 were, furthermore, subjected to a sulphuric acid test. The test specimens used were steel substrates of size 10×10 cm, fired for 4 minutes at 830° C. These were subjected to contact with 1% strength hot sulphuric acid at 95° C. for 2 hours. The removal of material was less than 2 g/m².

It will be understood that the specification and examples are illustrative but not limitative of the present invention and that other embodiments within the spirit and scope of the invention will suggest themselves to those skilled in the art.

We claim:

1. In an enamel frit comprising $SiO_2$, $B_2O_3$, $Na_2O$, $Li_2O$, F, CoO, and also comprising $K_2O$, MgO, CaO, BaO, $Al_2O_3$, $TiO_2$, $ZrO_2$, NiO, CuO, MnO, $Fe_2O_3$, $MoO_3$, ZnO, the improvement wherein at least about 40% are silicon atoms, 50% are silicon atoms and boron atoms, where the proportion of the boron atoms should not fall below 6.5%, 63% are silicon atoms, boron atoms and sodium atoms, where the proportion of the sodium atoms should not fall below 7.5%, each relative to the overall total of the non-oxygen atoms in the frit, the proportion of the remaining non-oxygen atoms being less than about 37%, 1.0 to 1.2% of cobalt atoms as well as x fluorine atoms with $1\% \leq x \leq 11\%$ and at least y lithium atoms and at most 2 y lithium atoms with $y = (15/x) + 5$ being present, the proportion of lithium atoms being from about 6.3% to 20% relative to the overall total of the non-oxygen atoms in the frit.

2. An enamel frit with a composition according to claim 1 comprising at least about 40% of silicon atoms, 50% of silicon atoms and boron atoms, where the proportion of the boron atoms should not fall below 6.5%, 63% of silicon atoms, boron atoms and sodium atoms, where the proportion of the sodium atoms should not fall below 7.5%, each relative to the overall total of the non-oxygen atoms in the frit, the proportion of the remaining non-oxygen atoms being less than about 37%, 1.0 to 1.2% of cobalt atoms as well as y lithium atoms with $6.3\% \leq y \leq 20\%$ and at least x fluorine atoms and at most 2 x fluorine atoms with $x = 15/(y-5)$ being present, the proportion of fluorine atoms being from about 1% to 11% relative to the overall total of the non-oxygen atoms in the frit.

* * * * *